United States Patent
Steenburgh

[11] Patent Number: 6,070,605
[45] Date of Patent: Jun. 6, 2000

[54] STEAM TURBINE VALVE DISK VIBRATION REDUCER

[75] Inventor: John Howard Steenburgh, Amsterdam, N.Y.

[73] Assignee: General Electric Co., Schenectady, N.Y.

[21] Appl. No.: 09/236,733

[22] Filed: Jan. 25, 1999

[51] Int. Cl.$^7$ ................................................ F16K 11/20
[52] U.S. Cl. ..................... 137/1; 137/614.19; 137/637.2; 251/63.6
[58] Field of Search ........................ 137/614.18, 614.17, 137/614.16, 240, 614.19, 613, 637, 637.2; 251/63.5, 63.6

[56] References Cited

U.S. PATENT DOCUMENTS

| | | | |
|---|---|---|---|
| 4,304,251 | 12/1981 | Schädel et al. | 137/614.18 X |
| 4,360,039 | 11/1982 | Jeppsson | 137/614.17 X |
| 4,460,014 | 7/1984 | Mases et al. | 137/614.18 |
| 4,617,955 | 10/1986 | Melgaard | 137/240 |

*Primary Examiner*—Kevin Lee
*Attorney, Agent, or Firm*—Nixon & Vanderhye

[57] ABSTRACT

A steam valve for a steam turbine includes a control valve head having a recess and a stop valve head disposed within the recess of the control valve head, both heads having sealing surfaces in opposition to a valve seat. The control valve head is displaced by a control system in accordance with steam turbine requirements. The stop valve head provides a fast-acting valve to close the steam valve in response to a turbine upset. The control system, at least during throttling operations, controls the position of the stop valve head in proportion to the position of the control valve head such that vortex flow past the surfaces and valve seat is minimized or eliminated and substantial laminar flow occurs across the sealing surfaces of the stop valve and control valve heads.

8 Claims, 3 Drawing Sheets

STEAM TURBINE VALVE DISK VIBRATION REDUCER

TECHNICAL FIELD

The present invention relates to inlet valves for a steam turbine and particularly relates to a combined control valve and stop valve and methods of operation wherein the stop valve is controlled in proportion to the control valve to reduce valve vibration.

BACKGROUND OF THE INVENTION

An inlet valve is used to supply steam via a main high-pressure inlet or at a reheat intermediate pressure inlet to a steam turbine. Typically, such valves comprise a combined valve assembly incorporating two valve disks that perform the required functions in conjunction with a single valve seat. For example, in a main high-pressure steam inlet line, the upper valve disk is referred to as a control valve or intercept valve and the lower valve disk is referred to as a main stop valve or reheat stop valve, hereafter called control and stop valves, respectively. The control valve disk conventionally includes an annular valve element having a bottom opening recess, the margins of which valve disk seat against a valve seat in a closed position of the control valve. The control valve has a proportional control device, for example, a servo valve, for positioning the control valve disk relative to the valve seat to control the flow through the steam inlet.

The stop valve disk is typically controlled from below the inlet for movement between a fully valve-open position within the recess of the control valve and a valve-closed position seating on the steam inlet valve seat. Consequently, during operation, the stop valve is normally fully opened at all times and the control valve is opened to a greater or less extent to control the steam flow to the turbine section by throttling the control valve disk. For example, if the turbine speeds up above normal speed, the control valve starts to close rapidly to avoid turbine operation going to a destructive overspeed condition. The stop valve remains in its full open position. If the turbine speed continues to increase, a fast close signal is applied to both the stop valve and the control valve to close the steam inlet valve to the turbine. The stop valve closes immediately because it is a faster acting valve than the control valve.

When the control valve is throttled, typically below about 50% of maximum disk lift, flow phenomena within the valve may cause instabilities which, in turn, result in undesirable vibration, leading to component wear and/or fatigue-related failure of the valve or associate piping or turbine systems. Typically, control valves were not previously used in a tight control mode of operation, i.e., constant throttling at very low valve lift, high-pressure and low flow, so that the valve passageway is quite tight. Because the combined valves were not used in the past for extensive periods in a throttling mode, this inherent problem has not been addressed. However, recent valve designs have required more extensive throttling of the combined valves, causing vibration to become an issue due to excessive wear of the valve and/or associated piping components requiring maintenance or forced outages as a result of severe vibration.

After analysis, the cause of the problem appears to reside in the separation of the steam flow from walls defining the flow passage past the control valve and seat. Vortex flow is believed to occur downstream of the control valve and seat, causing a change in the forces on the control valve disk, in turn causing the disk to oscillate.

BRIEF SUMMARY OF THE INVENTION

According to the present invention, a proportional control is applied to the stop valve such that the stop valve position will follow the control valve position, at least during periods of anticipated flow instabilities, i.e., throttling operation. The underside of the stop valve disk has a surface which forms a substantial flow continuation of the valve surface of the control valve. By aligning these surfaces with one another and maintaining those surfaces in alignment during throttling of the control valve with following movement of the stop valve, a substantially laminar flow is provided past the combined control and stop valve disks and valve seat. This relatively smooth flow path past the combined control and stop valves and valve seat reduces vibration of the valve disks during control valve throttling through the improved flow path which reduces the instabilities in the flow, minimizing or eliminating vibration and attendant problems in the valve and the system.

To accomplish this, a position control transducer is provided on the stop valve and provides an output signal proportional to the position of the stop valve relative to the valve seat. This signal is applied to the steam turbine control system and compared with the position of the control valve. An error signal is then generated which controls a servo valve to supply exhaust fluid to or from a fluid-actuated cylinder whereby the stop valve position is determined in accordance with the control valve position. Thus, with the stop valve following the movement of the control valve during throttling operations and with the flow surfaces of the control and stop valve disks aligned to provide laminar flow past the valve, vibration is substantially eliminated or minimized.

In a preferred embodiment according to the present invention, there is provided a valve for supplying steam to a steam turbine, comprising a generally annular valve seat defining a steam flow passage, a control valve in the passage including a control valve head having a recess on a downstream side of the control valve, the control valve head being movable toward and away from the valve seat, a control system for positioning the control valve head in selected positions relative to the valve seat to selectively control the flow of steam through the valve, a stop valve having a stop valve head generally within the recess and a sealing surface for engagement with the valve seat in a stop valve-closed position, the control system positioning the stop valve head in relation to the control valve head to provide substantially laminar flow past the control valve and the stop valve.

In a further preferred embodiment according to the present invention, there is provided in a valve for supplying steam to a steam turbine having a valve seat, a control valve having a control valve head with a sealing surface and a stop valve having a stop valve head with a sealing surface, wherein a control system controls movement of the control valve head toward and away from the valve seat, a method of controlling the flow through the valve, comprising the step of controlling the position of the stop valve head relative to the valve seat in proportion to the position of the control valve head relative to the valve seat to minimize or eliminate vortex flow past the surfaces and the seat.

Accordingly, it is a primary object of the present invention to provide a novel and improved steam valve for supplying steam to a steam turbine having a flow control valve and a stop valve wherein the stop valve position is determined in accordance with the control valve position to provide a laminar flow through the steam valve, minimizing or eliminating flow instabilities and vibration.

DETAILED DESCRIPTION OF THE INVENTION

Figure 1:
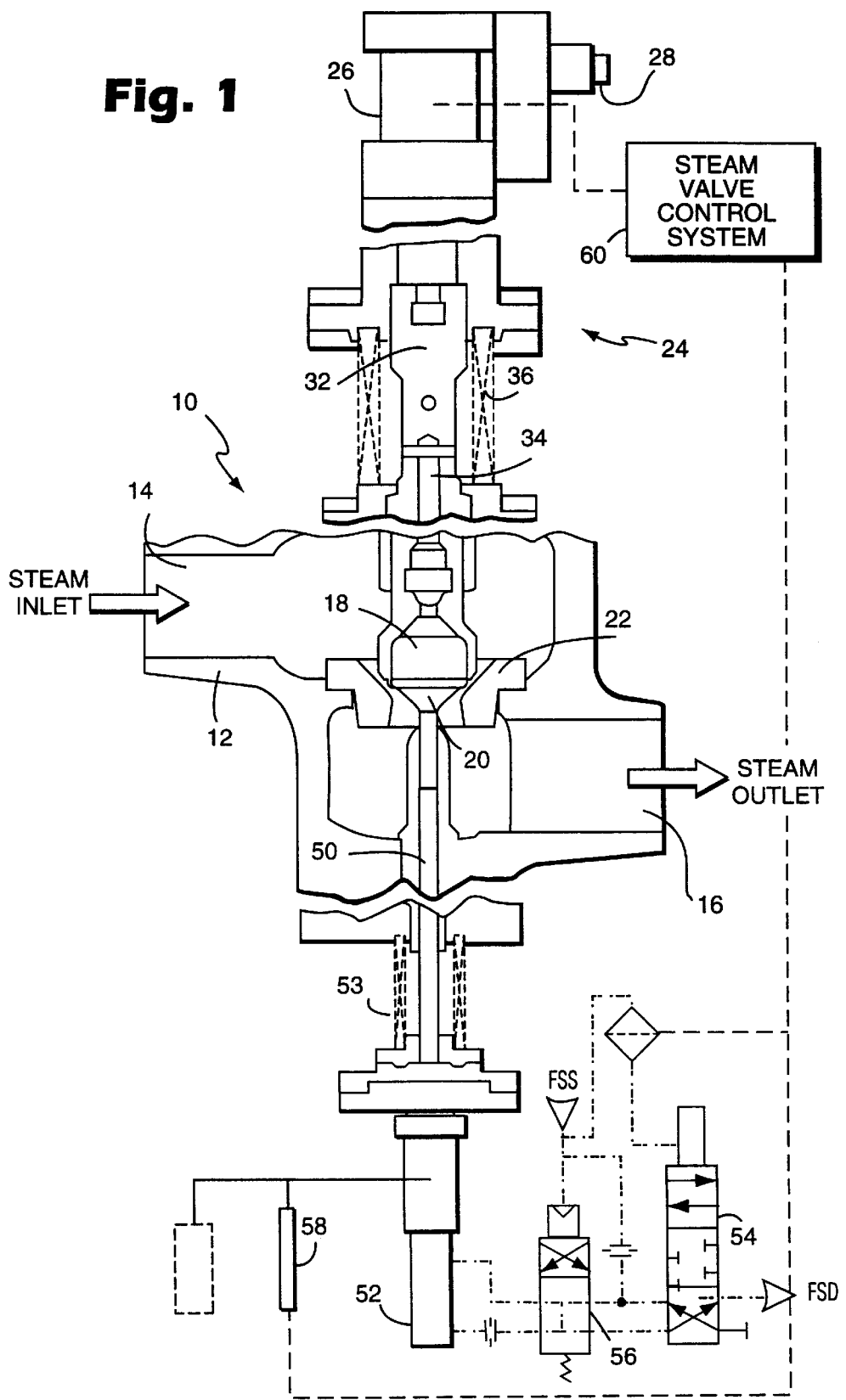
FIG. 1 is a fragmentary schematic elevational view with portions broken out of a steam valve constructed in accordance with the present invention.

Referring to FIG. 1, there is illustrated a steam valve, generally designated 10, having a steam valve body 12 with a steam inlet 14 and a steam outlet 16. Between the inlet and outlet 14 and 16, there is provided a flow control valve 17 having a control valve head 18, a stop valve 19 having a stop valve head 20 and a valve seat 22. Above the flow control valve 18, there is provided a control valve actuator, generally designated 24. Actuator 24 very generally includes a hydraulic cylinder 26 under the control of a servovalve 28 for supplying fluid to the cylinder 26 to raise and lower the control valve head 18. The piston of the cylinder 26 is coupled to a cross head 32, in turn coupled to a vertical shaft 34 for raising the valve head 18 against the bias of helical coil springs 36. The springs 36 are employed to fast-close the flow control valve 18 when the hydraulic fluid is dumped from cylinder 26 upon receiving a fast-close signal from a steam valve control system. Thus, it will be appreciated that by using the servovalve 28, the position of the flow control head 18 relative to the seat 22 can be controlled when load changes are made by the turbine. For example, if the turbine speed speeds up above normal, the control valve will start to close off the steam flow between steam inlet 14 and steam outlet 16. Should a fast-close control signal be received from the control system, the servovalve dumps the hydraulic fluid and the spring 36 fast-closes the flow control valve 18 to close the valve between the steam inlet and outlet 14 and 16, respectively.

Figure 3:
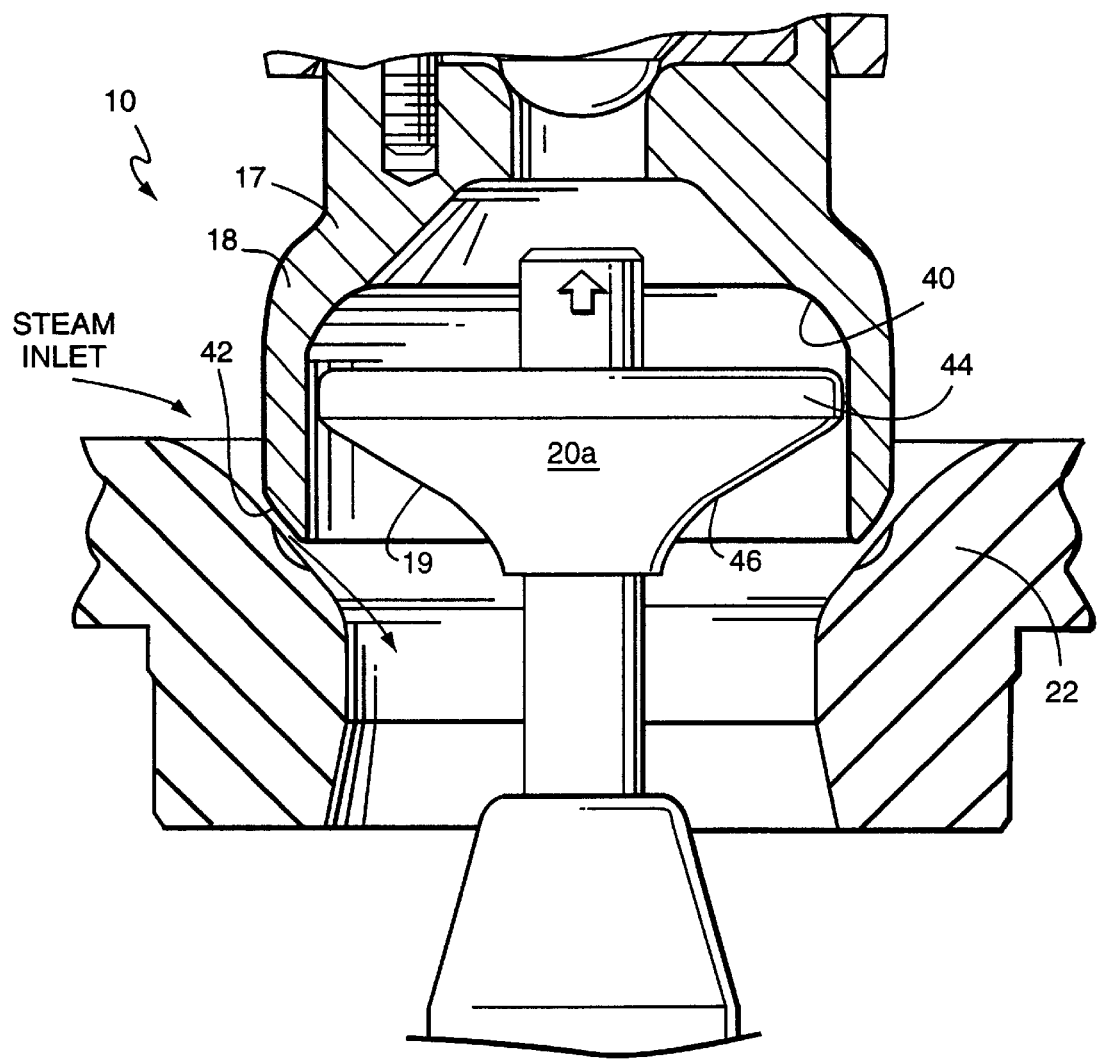
FIG. 3 is a view similar to FIG. 2, illustrating a combined flow control valve and stop valve according to the prior art.

As illustrated in FIG. 3 and in a typical steam valve, the control valve head 18 is hollow along its underside, forming a recess 40. The control valve head 18 has a generally annular surface 42 for engaging and sealing against the seat 22. The stop valve 20a includes a stop valve head 44 having a surface 46 for engaging and sealing against the seat 22, closing the steam valve. However, as illustrated in FIG. 3, the stop valve head 44 is typically disposed near the base of the recess 40 well distanced from the annular surface 42 of the control valve head 18. The prior art stop valve 20a is typically spring-biased toward a valve-closed position. A hydraulic cylinder, not shown, forming part of a stop valve actuator, maintains the stop valve in a full open position. When the solenoid-operated valve controlling the flow of hydraulic fluid to the stop valve cylinder receives a stop valve fast-close signal, the valve dumps the hydraulic fluid, enabling springs to fast-close the stop valve into engagement with seat 22.

It will be appreciated from a review of FIG. 3 that the stop valve 20a in its full open position is spaced substantially from the valve surface 42. When the control valve is throttling, typically below about 50% of maximum disk lift, flow phenomena within the valve causes instabilities, such as undesirable vibration, leading to component wear and fatigue-related failure. Vibration leads to excess wear of the valve and associated piping components and requires excessive maintenance. It is believed that these flow instabilities are caused by the turbulent vortex flow downstream of the control valve sealing surface 42. That is, the steam flows through the annular space between the valve sealing surface 42 and the seat 22 and then expands into a large region without constraint, causing vortex flow.

The present invention employs a proportional control for the stop valve such that it follows the control valve position, maintaining alignment of the sealing surfaces of the stop valve disk and the control valve disk to provide a smooth flow path during most operational positions of the control valve. Thus, instead of an abrupt flow of steam into an enlarged region as illustrated in the prior art steam valve of FIG. 3, the present invention provides for a smooth laminar flow of steam from the inlet to the outlet past the sealing surface 42 and surface on the stop valve which combine to form a generally laminar flow through the valve toward the steam outlet. Thus, the stop valve may follow the control valve operation during all positions of the control valve or may follow the control valve until such time the control valve reaches a position where flow instability is not a factor, typically above 50% lift.

Referring back to FIG. 1, the stop valve head is mounted on a shaft 50 which extends through suitable packing to a hydraulic cylinder 52. Springs 53 are provided for biasing the stop valve head to a valve-closed position, i.e., to fast-close the stop valve. A servovalve 54 is provided for supplying hydraulic fluid to and from opposite sides of the piston of the hydraulic cylinder 52. Additionally, a fast-acting dump valve 56 is provided for dumping hydraulic fluid from the cylinder 52 in response to a fast-close signal from the steam valve control system. A transducer 58 is provided to sense the position of the stop valve and provide the sensed position to the steam valve control system 60. The control system includes a servo valve, not shown, for supplying fluid to and receiving fluid from the cylinder 26 for positioning the control valve head 18 relative to seat 22. Position transducers on the control valve sense control valve position. The control system, in turn, controls the solenoid-actuated valve 54 to supply hydraulic fluid to the cylinder 52 to maintain the position of the stop valve head 20 proportional to the position of the control valve head 18, at least during anticipated periods of unstable flow through the valve. Thus, in at least those positions of the control valve head where flow instabilities are anticipated, the stop valve head 20 follows the control valve head 18 such that the valve surfaces 42 and 46 are aligned throughout such movement of the control valve to effect laminar flow past the valve seat to the steam outlet, thereby reducing flow instabilities and vibration.

More particularly, at startup, the stop valve is typically opened to an intermediate position, for example, 25% of the normal lift. (The stop valve must be opened prior to opening the control valve because the stop valve hydraulic cylinder 52 does not have sufficient force to allow the stop valve to open with rated steam pressure above the stop valve disk). There are different methods employed for starting units that employ the valve design of the present invention. For example, the unit may be rolled, accelerated, synchronized and loaded using the control valve. In other instances, a bypass arrangement may be employed. In such cases, the control valve is held shut, usually until the unit is synchronized and combined reheat valves are employed to roll, accelerate and synchronize using bypass steam. To either start the unit using the control valve or to have a control valve assume load and/or speed control after bypass startup, the stop valve would be opened by servovalve operation to the intermediate position, e.g., 25% of normal lift. Position transducers on the control valve sense the control valve position and the position signal from the control valve is compared to that of the stop valve position transducer signal. The control system 60 sends a signal proportional to the difference between the control valve position and stop valve position such that the stop valve position is driven to match the position of the control valve. This action continues while the unit is started and loaded, at least until such time that the control valve reaches a position where the flow instability is no longer a factor, typically above 50% lift. At that point, the stop valve may be driven to a full open position and no longer follow the control valve position. This would occur typically at about 75% lift. There may, however, be instances where the unit is always left in a control mode with the stop valve position matching control valve position throughout substantially their entire range of movement.

Figure 2:
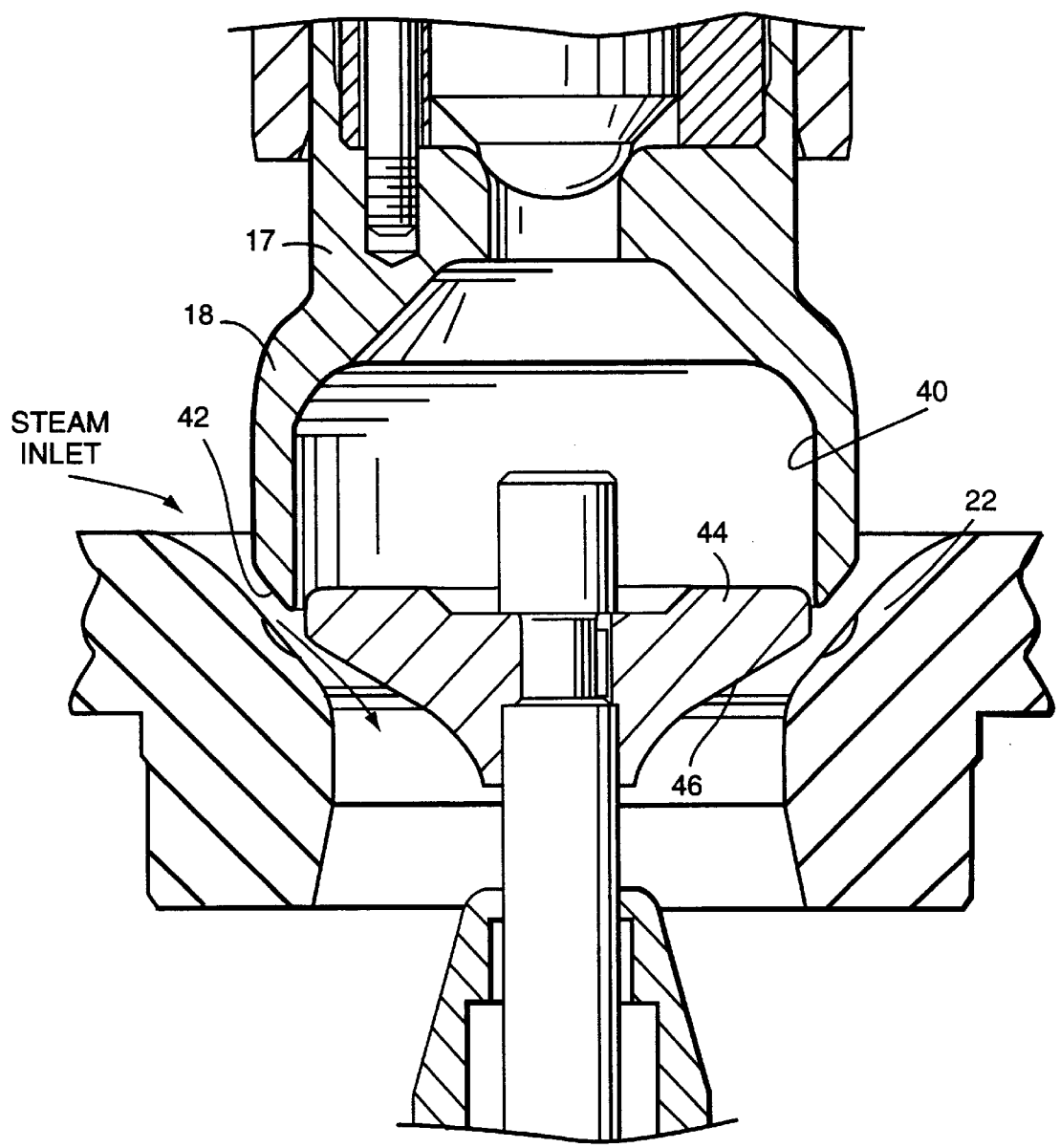
FIG. 2 is an enlarged fragmentary cross-sectional view illustrating the flow control valve and stop valve in a valve-open condition.

Thus, as illustrated in FIG. 2, the stop valve sealing surface 46 and the control valve sealing surface 42 are generally aligned with one another to form a substantially continuous laminar flow surface opposite the valve seat 22 during anticipated periods of flow instability. The control valve is illustrated in a throttled position relative to the valve seat and, as aforesaid, 20 the stop valve follows the movement of the control valve such that the valve sealing surfaces 42 and 46 remain substantially in the position illustrated in FIG. 2 throughout the range of movement of the control valve during periods of anticipated flow instabilities and in some instances throughout the entire range of movement of the control valve, thereby affording substantially continuous laminar flow between the control and stop valve sealing surfaces and the valve seat.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a valve for supplying steam to a steam turbine having a valve seat, a control valve having a control valve head with a sealing surface and a stop valve having a stop valve head with a sealing surface, wherein a control system controls movement of the control valve head toward and away from the valve seat, a method of controlling the flow through the valve, comprising the step of:

controlling the position of the stop valve head relative to the valve seat in proportion to the position of the control valve head relative to the valve seat to minimize or eliminate vortex flow past said surfaces and said seat and independently of the position of the control valve head for moving the stop valve head into a stop valve closed position engaging said valve seat.

2. A method according to claim 1 including maintaining the surfaces in substantial alignment with one another to provide a substantially continuous smooth flow surface affording substantial laminar flow past said surfaces and said seat.

3. A method according to claim 1 including biasing said stop valve head for movement toward said valve seat.

4. A method according to claim 1 including controlling the position of the stop valve relative to the valve seat in proportion to the position of the control valve head relative to the valve seat during throttling valve operation and displacing the stop valve during non-throttling operations to a full open position independent of the position of the control valve.

5. A valve for supplying steam to a steam turbine, comprising:

a generally annular valve seat defining a steam flow passage;

a control valve in said passage including a control valve head having a recess on a downstream side of said control valve, said control valve head being movable toward and away from said valve seat;

a stop valve having a stop valve head generally within said recess and a sealing surface for engagement with said valve seat in a stop valve-closed position;

a control system for positioning said control valve head in selected positions relative to said valve seat and independently of the stop valve head position to selectively control the flow of steam through said valve; and said control system including at least one valve for positioning said stop valve head in proportion to the position of said control valve head such that the stop valve head follows the movement of the control valve head over a predetermined range of movement thereof;

said control system including a spring for displacing said stop valve head into a stop valve-closed position independently of the position of said control valve head.

6. A valve according to claim 5 wherein said stop valve head and said control valve head have respective surfaces for sealing against said valve seat, said control system positioning said stop valve head and said control valve head such that said surfaces form a substantially continuous laminar flow surface opposite said valve seat affording substantially laminar flow past said control valve and said stop valve.

7. A valve according to claim 5 wherein said control system includes a fluid-actuated cylinder for positioning said stop valve head relative to said control valve and said seat, and a dump valve for dumping fluid from said cylinder enabling said spring to displace said stop valve head against said seat.

8. A valve according to claim 5 wherein said control system positions said stop valve head to follow the movement of said control valve head over the full range of movement of said control valve head.

\* \* \* \* \*